Patented Sept. 17, 1940

2,215,095

UNITED STATES PATENT OFFICE 2,215,095

PRODUCTION OF MALEIC ACID

Otto Drossbach, Ludwigshafen-on-the-Rhine, Germany, assignor, by mesne assignments, to General Aniline & Film Corporation, New York, N. Y., a corporation of Delaware No Drawing. Application November 9, 1939, Serial No. 303,537. In Germany December 12, 1938

6 Claims. (Cl. 260—537)

The present invention relates to the production of maleic acid by the catalytic oxidation of mononuclear cyclic compounds containing one oxygen atom as a member of the ring.

The preparation of maleic acid by the catalytic oxidation of organic compounds has heretofore been suggested. Thus, benzene has been led in the vapor state together with oxygen or air over oxidation catalysts in order to produce maleic acid. Diolefinic hydrocarbons, such as 1.3-butadiene or cyclopentadiene, have likewise been converted into maleic acid. It has also been proposed to catalytically oxidize compounds of the furane series containing conjugated olefinic linkages, such as furane itself and its substitution products. In the production of maleic acid from these compounds, there are usually formed various by-products, such as carbon dioxide which decrease the yield of maleic acid.

The present invention has the main object to provide as the starting material for the catalytic production of maleic acid two compounds which yield extraordinarily high yields of very pure maleic acid. I have found that hydrogenated furanes, i. e. dihydrofurane and tetrahydrofurane, may be easily and economically converted into maleic acid by passing the vapors of dihydrofurane or tetrahydrofurane or of a mixture thereof, in admixture with oxygen, air or another oxygen containing gas, such as mixtures of oxygen and carbon dioxide or steam, over a suitable oxidation catalyst. It is to be understood that the term "maleic acid" as used herein includes both the anhydride and the hydrate. Under the reaction conditions the anhydride and the hydrate thereof are often formed together.

The oxidation is carried out preferably at temperatures ranging from 250 to 600° C., and preferably from 250 to 450° C. The actual temperature to be used depends on the activity of the catalyst and on the time of contact between the reaction mixture of gases and the catalyst. When working at comparatively low temperatures, e. g. within the range of approximately 250 to 300° C., the time of contact should be longer than at higher temperatures. In general, the time of contact may vary over a considerable range without materially affecting the yield of maleic acid. The time of contact should be long enough to insure that the starting material introduced is wholly, or almost wholly subjected to oxidation before leaving the catalyst.

The concentration of the vaporized starting material in the mixture to be passed over the catalyst may also vary to a considerable extent. Generally speaking, it is preferable to provide for an excess of oxygen, air or other oxygen containing gases. The ratio of di- or tetrahydrofurane to oxidizing gas is preferably within the range of approximately from 1:20 to 1:150. It is selfunderstood that higher proportions of the oxidizing gas may be used but this does not involve economical advantages because too large an excess of the oxidizing gas simply constitutes a diluent decreasing the yield per unit of time and reaction space and rendering the recovery of maleic acid more difficult. Higher ratios of di- or tetrahydrofurane may also be employed provided that care is taken to avoid explosive conditions.

As catalyst there may be used any good catalyst capable of promoting the oxidation of organic compounds to dicarboxylic acids, e. g. the oxidation of benzene, crotonaldehyde, butylene glycol or diolefines to maleic acid. Catalysts containing as their main reactive component one or more difficultly reducible oxides of a metal from the fifth or sixth group of the periodic table are particularly suitable. These oxides may also be used in the form of salts. Among the oxides which have been found to be especially suitable oxidation catalysts according to my invention there may be mentioned oxides of vanadium and molybdenum, in particular vanadic and molybdic acid or lower oxides of these metals and mixtures thereof in varying proportions. Titanic acid may also be used, especially when admixed with the lower oxides of vanadium and molybdenum as they are obtained, for example, by reducing vanadic or molybdic acid by means of aqueous oxalic acid. The oxides of vanadium and molybdenum may also be admixed with zinc oxide, cerium oxide, tungstic acid, chromium oxide, lead oxide or cobalt oxide. These catalysts may be employed either alone or applied to the conventional carrier substances, such as pumice stone, aluminum oxide, fused silica and the like. It will be understood that the above given explanation of the catalysts is merely given for purposes of illustration and that the specific catalyst is not an essential part of my invention but that numerous modifications of these catalysts may be made without departure from the spirit of my invention and that any other of the conventional catalysts employed in oxidations of this type may be used.

The catalyst is preferably arranged in the form of layers in a vertical tube or a plurality of such tubes or filled into a horizontal tube or a plurality of such tubes. The length of the catalyst layer may vary between a few centimeters and one or more meters. When employing short catalyst layers, the reaction temperature should be comparatively high and the speed of flow should be so chosen that the reaction mixture of gases is in contact with the catalyst less than one second.

The invention will be described in greater detail in the following examples which illustrate a few typical embodiments of the invention. It is, however, not restricted to these examples. The parts are by weight unless otherwise stated.

*Example 1*

110 parts of ammonium molybdate, 32 parts of vanadic acid and 60 parts of titanium dioxide are boiled with 1000 parts of water under addition of 40 parts of oxalic acid until the solution becomes deep blue. This coloration is caused by lower molybdenum oxides and vanadium oxalate. 30 parts of ammonium chloride and 500 parts of granulated pumice stone are added and the whole is stirred and heated to a temperature at which the water is vaporized. The catalyst is then heated in vacuo to 300° C. until the ammonium salts have been removed.

A mixture of 200 liters of oxygen is led per hour over 25 cubic centimeters of the catalyst at 290° C. Tetrahydrofurane is uniformly vaporized in the oxygen stream in a ratio that 5 grams per hour of tetrahydrofurane are passed over the catalyst. The reaction gases are cooled, whereby white crystals of maleic acid anhydride and maleic acid are precipitated off. From 100 parts of tetrahydrofurane from 80 to 90 parts of maleic acid are formed (calculated on the hydrate).

*Example 2*

Over 100 cubic centimeters of a catalyst prepared in the manner described in Example 1 there are led per hour 240 liters of air which has been loaded with 6 grams of vaporized 2.5-dihydrofurane. The reaction gases are cooled to 53° C. whereby part of the maleic acid formed is deposited in the form of a liquid. From the residual gases there are recovered further amounts of maleic acid. From 100 parts of dihydrofurane there are obtained from 120 to 130 parts of maleic acid (calculated on the hydrate).

What I claim is:

1. A process for the production of maleic acid which comprises passing a vaporous mixture of a cyclic oxygen compound selected from the group consisting of dihydrofurane and tetrahydrofurane with a gas comprising oxygen over an oxidizing catalyst at a temperature within the range of 250° to 650° C.

2. A process for the production of maleic acid which comprises passing a vaporous mixture of a cyclic oxygen compound selected from the group consisting of dihydrofurane and tetrahydrofurane with a gas comprising oxygen over an oxidizing catalyst at a temperature within the range of 250° to 450° C.

3. A process for the production of maleic acid which comprises passing a vaporous mixture of a cyclic oxygen compound selected from the group consisting of dihydrofurane and tetrahydrofurane with oxygen and an inert diluent gas over an oxidizing catalyst at a temperature within the range of 250° to 450° C.

4. A process for the production of maleic acid which comprises passing a vaporous mixture of a cyclic oxygen compound selected from the group consisting of dihydrofurane and tetrahydrofurane with a gas comprising oxygen over a catalyst comprising a difficultly reducible oxide of a metal selected from the fifth and sixth group of the Periodic Table at a temperature within the range of 250° to 450° C.

5. A process for the production of maleic acid which comprises passing a vaporous mixture of a cyclic oxygen compound selected from the group consisting of dihydrofurane and tetrahydrofurane with a gas comprising oxygen over a vanadium oxide catalyst at a temperature within the range of 250° to 450° C.

6. A process for the production of maleic acid which comprises passing a vaporous mixture of dihydrofurane with air over a vanadium oxide catalyst containing also molybdenum oxide at a temperature within the range of 250° to 450° C.

OTTO DROSSBACH.